Patented Dec. 24, 1940

2,226,126

UNITED STATES PATENT OFFICE 2,226,126

COMPOSITION OF MATTER

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Original application April 19, 1939, Serial No. 268,818. Divided and this application January 26, 1940, Serial No. 315,764

9 Claims. (Cl. 260—404)

This application is a division of our pending application for patent Serial No. 268,818, filed April 19, 1939, for Process for resolving petroleum emulsions, which subsequently matured as U. S. Patent No. 2,192,995, dated March 12, 1940.

The object of our present invention is to provide a new material or composition of matter, that is particularly adapted for use as a demulsifier in the resolution of crude oil emulsions, but which may have uses in other arts that we have not yet investigated.

The new composition of matter which constitutes our present invention consists of a certain kind of complex amine derived (a) by reaction between a polybasic carboxy acid body, such as phthalic anhydride, and (b) simpler amines of the kind hereinafter described. Said new compound or composition of matter is particularly adapted for use as a demulsifier for crude oil emulsions, either alone, or in admixture with conventional demulsifying agents of a compatible type.

Attention is directed to our U. S. Patent No. 2,154,422, dated April 18, 1939. In said patent there is described an amine summarized by the following formula:

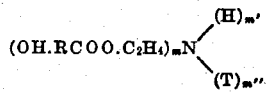

in which $m$ represents the numeral 1, 2 or 3, $m'$ represents the numeral 0, 1 or 2, and $m''$ represents the numeral 0, 1 or 2, with the proviso that $m+m'+m''=3$.

However, the radical $C_2H_4$, which appears in the above formula, may represent any similar radical, such as a $C_3H_6$ radical, $C_4H_8$ radical, etc., and therefore, the above formula may be rewritten:

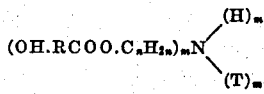

where $n$ represents a small whole number, preferably not over 10.

In the above formula, T represents an aliphatic hydrocarbon radical, such as a methyl, ethyl, propyl, amyl, or similar radical; or T may represent a non-hydroxy alicyclic radical, such as a cyclohexyl radical, or a non-hydroxy aralkyl radical, such as a benzyl radical; or the acylated radical obtained by replacing a hydrogen atom of the hydroxyl group of an alkylol radical by the acyl radical of a monobasic carboxy acid, such as acetic acid, butyric acid, oleic acid, stearic acid, naphthenic acid, abietic acid, or the like, all of which are characterized by having less than 32 atoms. The alkylol radical, prior to acylation, may be a hydroxy alicyclic or a hydroxy aralkyl radical, provided that the hydroxy radical is attached to the aliphatic residue of the aralkyl radical. In the above formulas, OH.RCOOH represents a hydroxylated fatty acid, such as ricinoleic acid, hydroxystearic acid, dihydroxystearic acid, diricinoleic acid, triricinoleic acid, polyricinoleic acid, etc.; and OH.RCOO represents the oxy acyl radical derived from such acid, i. e., the ordinary acid radical. Blown oils (oxidized oils) are not included.

Similarly, attention is directed to our U. S. Patent No. 2,154,423, dated April 18, 1939. In said last mentioned patent there are described compounds which may be summarized by the following formula:

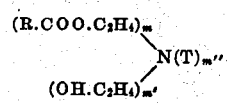

in which $m$ represents the number 1 or 2, $m'$ represents the number 1 or 2, and $m''$ represents the number 0 or 1, with the proviso that $m+m'+m''=3$.

However, the radical $C_2H_4$, which appears in the above formula, may represent any similar radical, such as a $C_3H_6$ radical, a $C_3H_8$ radical, etc., and therefore, the above formula may be rewritten:

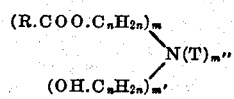

where $n$ represents a small whole number, preferably not over 10.

In the above group, T represents a hydrogen atom or an aliphatic hydrocarbon radical, such as a methyl, ethyl, propyl, amyl, or similar radical; or T may represent a non-hydroxy alicyclic radical, such as a cyclohexyl radical, or a non-hydroxy aralkyl radical, such as a benzyl radical; or the acylated radical obtained by replacing a hydrogen atom of the hydroxyl group of an alkylol radical by the acyl radical of a monobasic carboxy acid, such as acetic acid, butyric acid, heptoic acid, or the like, all of which are characterized by having less than 8 carbon atoms. The alkylol radical, prior to acylation, may be a hydroxy alicyclic or a hydroxy aralkyl radical, provided that the hydroxy radical is attached to the aliphatic residue of the aralkyl radical.

In the above formula, R.COO represents the oxy-acyl or acid radical derived from the acid R.COOH. R.COOH represents any monobasic detergent-forming carboxy acid, such as a typical fatty acid or abietic acid or naphthenic acid. Typical fatty acids are those which occur in naturally-occurring oils and fats, and generally have 8 or more carbon atoms, and not over 32 carbon atoms. Common examples include oleic acid, stearic acid, linoleic acid, linolenic acid, ricinoleic acid, erucic acid, palmitic acid, myristic acid, etc. These acids combine with alkali to produce soap or soap-like materials, and are commonly referred to as being monobasic detergent-forming carboxy acids. Blown oils (oxidized oils) are not included.

In each of said U. S. Patents Nos. 2,154,422 and 2,154,423, both dated April 18, 1939, attention is directed to the fact that having prepared the relatively simple intermediate amine of the kind previously described, the second step in the preparation of the new compositions of matter is to produce an esterified amine of the kind obtainable by reaction with a carboxy acid or its functional equivalent, such as an anhydride, with the proviso that such functional equivalent shall not include (a) the acid esters derived by reaction between a polybasic acid, such as phthalic acid or its anhydride, and an alcohol acid (hydroxy acid) such as ricinoleic acid and the like; or (b) the acid ester derived by a reaction between a polybasic carboxy acid, such as phthalic acid and its anhydride, and a fractional ester of the detergent-forming acid, such as mono-olein, mono-naphthenin, mono-abietin, etc.

As to further details regarding the various monocarboxy acidic compounds which may be employed, as to the various amines which may be employed, and as to the various polybasic carboxy acids or their equivalents which may be employed, as well as the method of manufacture, reference is made to the aforementioned patents, in which there are detailed descriptions.

For purposes of comparison, the two formulas which indicate the composition of the amines previously referred to are here repeated:

$$(OH.RCOO.C_nH_{2n})_mN\begin{matrix}(H)_{m'}\\(T)_{m''}\end{matrix}$$

$$\begin{matrix}(R'.COO.C_nH_{2n})_m\\(OH.C_nH_{2n})_{m'}\end{matrix}N(T)_{m''}$$

It is to be noted that the reaction between such amines and the polybasic carboxy acid, such as phthalic acid or phthalic anhydride, involves a hydroxyl radical attached either to a hydroxy hydrocarbon radical, which replaces an amino hydrogen atom, or a hydroxyl radical, which is part of a hydroxy fatty acid, such as ricinoleic acid.

Reference is made to the fact that in both of said patents it is pointed out that some other residue may replace the residue indicated by the radical $C_nH_{2n}$, and one example of such radical which may act as a substitute for the $C_nH_{2n}$ radical is the radical $OH.C_3H_5$, which is derived from glycerylamine or diglycerylamine, or the like, instead of being derived from ethanolamine, diethanolamine, or the like; all of which is stated in said patents in the following language:

"Attention is directed to the fact that the alkylolamines are obtained in such a manner that they may be looked upon as being derivatives of dihydric alcohols, or of the chlorhydrins of the dihydric alcohols. For example, the alkylolamines may be formed in the following manner:

As previously stated, the $C_2H_4$ radical may be any one of a number of hydrocarbon radicals which are aliphatic, alicyclic, or aralkyl in nature.

"It is at once manifest that similar derivatives are available from glycerols, polyglycerols, and the like, as indicated by the following reaction:

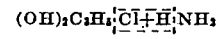

"It is not necessary to point out that the same types of reactions will produce secondary or tertiary amines, and that the reaction is not limited to a combination with ammonia, but may take place with a combination of other primary or secondary amines, such as amylamine, diamylamine, cyclohexylamine, dicyclohexylamine, benzylamine, dibenzylamine, amyl cyclohexylamine, etc.

"This means that in the type of material previously described there is a wide variety of material, such as monoglycerylamine, diglycerylamine, monoglyceryl diethylamine, monoglyceryl dipropylamine, diglyceryl propylamine, triglycerylamine, etc., which are functional equivalents of the various amines previously described for reaction with triricinolein and the like. When such amines are employed, instead of the radical ——$C_nH_{2n}$—— appearing in a compound, one would have in place thereof the radical ——$OH.C_3H_5$——; or, in case the hydroxyl radicals of these ——$OH.C_3H_5$—— radical had been removed by esterification with any available carboxyl, then the substituent which replaces the ——$C_nH_{2n}$—— radical might be indicated by the formula ——$D.C_3H_5$——. All that has been said here in regard to functional equivalents will be perfectly obvious, without further explanation to those skilled in the art. See U. S. Patent No. 2,091,704, dated August 31, 1937, to Duncan and McAllister; and also U. S. Patent No. 2,042,621, dated June 2, 1936, to Olin."

An examination of the two summarizing formulas above indicated suggests that as far as derivatives of glycerylamine or their functional equivalents are concerned, one may obtain products derived by reaction with phthalic anhydride or the like, which are different from the compositions of matter described in the co-pending applications in the following respects: (a) they do not involve reaction with a hydroxy hydrocarbon radical which replaces an amino hydrogen atom, as, for instance, an ethanol radical, and (b) they do not involve reaction with the alcoholiform hydroxyl of a fatty acid radical, as, for instance, the hydroxyl of a ricinoleic acid radical. All of which is apparent upon examination of the following formulas which indicate the nature of such materials. It is understood that materials of the type of formula subsequently included are analogs of materials of the type disclosed and described in said co-pending applications, and may be prepared by the same analogous methods. As to the general procedures employed for producing the intermediate or complex amines which are subsequently subjected to esterification with the polybasic carboxy acid, such as phthalic anhydride, reference is made to the aforementioned co-pending applications. Following the procedures of said co-pending applications, but using glycerylamines or their functional equivalents instead, one may obtained reagents exemplified by the following formulas

R.COO.C₃H₅(OH)NH₂
[R.COO.C₃H₅(OH)]₂NH
[R.COO.C₃H₅(OH)]₃N in which R.COO represents the oxy-acyl or acid radical derived from the acid R.COOH. R.COOH represents any non-hydroxy monobasic detergent-forming carboxy acid, such as a typical fatty acid or abietic acid or naphthenic acid. Typical fatty acids are those which occur in naturally-occurring oils and fats, and generally have eight or more carbon atoms and not over 32 carbon atoms. Common examples include oleic acid, stearic acid, linoleic acid, linolenic acid, erucic acid, palmitic acid, myristic acid, etc. These acids combine with alkali to produce soap or soap-like materials, and are commonly referred to as being monobasic detergent-forming carboxy acids. Blown oils (oxidized oils) are not included. An examination of the above formula indicates, however, that where an amino hydrogen atom exists, it may be replaced by some other radical, provided that the compound is still basic in character; for instance, the hydrogen atom may be replaced by an alkyl radical, an alicyclic radical, an aralkyl radical, or an acylated alkanol, provided there is no free hydroxyl still attached to the alkanolamine radical, and provided that the acyl group is derived from any suitable non-hydroxy acid such as acetic acid, butyric acid, heptoic acid, or any of the detergent-forming monocarboxy acids previously described. All of which may be summarized by rewriting the previous formulas in the following form:

R.COO.C₃H₅(OH)NT₂
[R.COO.C₃H₅(OH)]₂NT
R.COO.C₃H₅(OH) N[CₙH₂ₙOOCR']₂
[R.COO.C₃H₅(OH)]₂NCₙH₂ₙOOCR' in which R'.COO is the acid radical derived from an acid having less than 8 carbon atoms. Other obvious variants suggest themselves.

One need not, of course, be limited to compounds derived from glycerylamine, but one may consider amines derived from polyglycerylamines, for instance, diglycerol or triglycerol instead of monoglycerol. Reference is made to the following formulas which indicate the composition of suitable amines derived from diglycerol. In this connection it is to be noted that one is not limited to any particular isomeric form, but one isomer will serve as suitably as another.

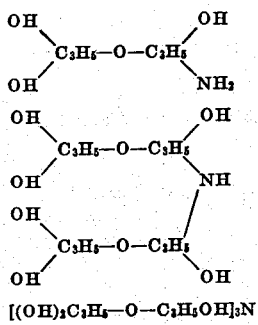

[(OH)₂C₃H₅—O—C₃H₅OH]₃N

If, instead of a derivative of diglycerol, one contemplates the equivalent amine derived from triglycerol, it is obvious that the counterpart of the last preceding formula is as follows:

[(OH)₂C₃H₅O—C₃H₅(OH)—OC₃H₅OH]₃N

It is to be noted that the difference between the amines derived from polyglycerolamines, as distinguished from those derived from glycerol, is that the hydrocarbon radical is interrupted at least once by an oxygen atom. For the sake of simplicity, the residue to which the amino nitrogen atom is attached and to which the hydroxyl radicals are also attached, will be referred to as a hydrocarbon radical, but it is understood that the word "hydrocarbon," as herein employed, including the appended claims, is intended to include the hydrocarbon radicals which are interrupted at least once by an oxygen atom.

For the sake of convenience, the previous formulas, that is, the formulas of the various glycerylamines, or their functional equivalents, may be indicated as follows:

[(OH)ₙD]ₘN(H)ₘ' in which D is a hydrocarbon residue, $n$ refers to the numeral 1 to 4, $m$ represents the numeral 1 to 3, and $m'$ represents the numeral 0 to 2. When such amines are treated with a detergent-forming acid, or still better, the ester of a detergent-forming acid, in the manner described in our previously mentioned patents, one obtains compounds in which one or more of the hydroxyl radicals attached to the radical D are replaced by non-hydroxylated detergent-forming monocarboxy acid radicals indicated by the formula R'.COO, and one or more of the remaining hydroxyls may be replaced by radicals such as R''.COO derived from acetic acid or some similar acid having less than 8 carbon atoms. Note the present significance of R' and R''. All of this may be indicated in one form by the following formula:

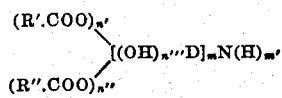

in which $n'$ represents the numeral 1 to 4, $n''$ the numeral 0 to 3, $n'''$ the numeral 0 to 3, $m$ the numeral 1 to 3, and $m'$ the numeral 0 to 2, with the proviso that at least one occurrence of D must have at least one hydroxyl radical attached thereto. As has been previously pointed out, instead of the amino hydrogen atom, one may have in place thereof any suitable radical, such as an alkyl radical, aralkyl radical, or any one of number of other radicals, except an aryl radical, because the aryl radical destroys or substantially eliminates the basicity of the nitrogen atom. What has been said previously may be indicated by again rewriting the formula immediately preceding, as follows:

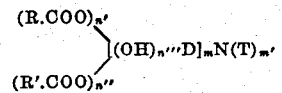

If one rewrites the formula for the glycerylamine or its homolog or the like in the following manner:

[(OH)ₙD]ₘN(T)ₘ' in which $n$ represents the numeral 1 to 4, $m$ the numeral 1 to 3, and $m'$ the numeral 0 to 2, and if for the moment one limits consideration to glycerylamines or the like which happen to be tertiary amines, that is, to such instances in which there is no amino hydrogen atom present, then compounds of the kind herein contemplated can be made from such amines with the same ease as they can be derived from the comparable tertiary amine, triethanolamine or mono-alkyl diethanolamine or dialkylethanolamine, as described in said co-pending applications previously mentioned.

Attention is directed to the following analogous reactions which appear in our prior patents previously mentioned, and which can be adapted just as suitably to the preesnt instance by replacing triethanolamine or the like with a glyceryl-amine, provided that it is a tertiary amine, such as diamylglycerylamine, amyl diglycerylamine, triglycerylamine, or the like, and provided at least one radical replacing an amino hydrogen radical represents a polyhydroxylated hydrocarbon radical, and provided that after reaction with the selected acid compounds, such as an ester, that there is attached at least one hydroxyl radical to the acylated hydrocarbon radical, which, in turn, is attached to the amino nitrogen atom. In other words, when reactions of the kind described in our prior patents previously mentioned are adapted to the present instance, the reactions between the suitable detergent-forming acids or compounds and the tertiary glyceryl amines or the like result in compounds which may be indicated in their simplest form by the following formulas (as previously noted), and which will again be repeated.

$$R.COO.C_3H_5(OH)NT_2$$
$$[R.COO.C_3H_5(OH)]_2NT$$
$$[R.COO.C_3H_5(OH)]_3N$$

If, however, one does not employ tertiary amines, but does employ primary or secondary amines, then in that event, other procedure may be employed to produce the desired type of compound in significant yield. Reference is made to the following equations:

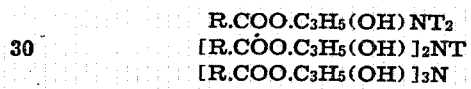

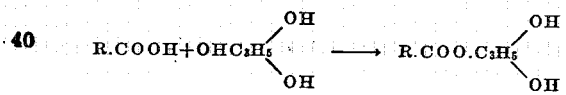

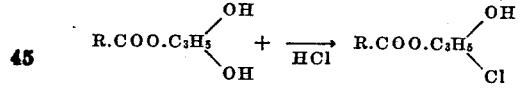

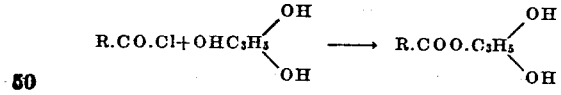

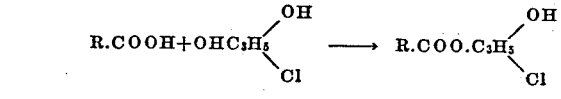

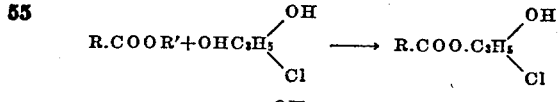

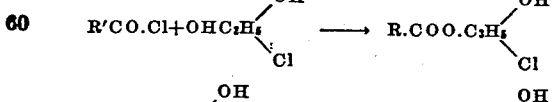

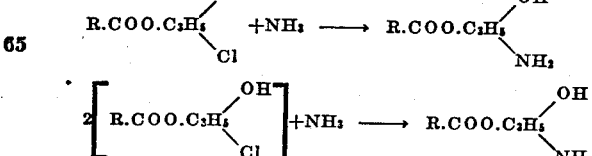

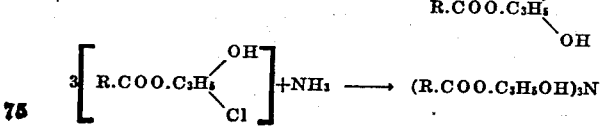

If, however, maximum yields are not necessary, one need not resort to reactions of the kind previously described to produce primary or secondary amines, but one may employ the following type of reaction:

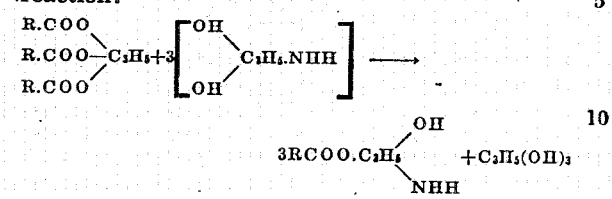

It is also to be noted that various other functional equivalents may be employed, for instance, there are available substituted or alkyl glycerols, such as propylglycerol, butylglycerol, and octylglycerol, or the like, in which such hydrocarbon radicals or other similar hydrocarbon radicals replace a hydrogen atom of the glyceryl radical. It is also known that glyceryl amines may be treated with alkylene oxides, such as ethylene oxide, to produce derivatives or substituted mono or diglycerylamines, in which one or both amino hydrogen atoms have been replaced by an hydroxy alkyl radical, and presumably similar derivatives are available in which there might be present an hydroxy alicyclic or hydroxyl aralkyl radical, instead of an hydroxyl alkyl radical. In the hereto appended claims, the word "alkanol" is intended to include hydroxy alicyclic and hydroxy aralkyl compounds. Various other variants suggest themselves, in view of what has been said here, and in view of the analogous reactions or compounds suggested in the previously mentioned co-pending applications. It is to be noted that all the amines of the kind described are basic in character, and that they do not contain the amide radical. It is to be noted that they are not quaternary ammonium bases, and that they are derived only from basic amines; it is to be further noted that the esterified amine has not lost any of the basicity of the original amine, and that said amines exhibit the property of a basic amine, that is, they combine with water to form a base which is presumably a substituted ammonium compound. For further elaboration in regard to what has just been said, reference is again made to the analogous compounds described in our U. S. patents aforementioned.

Our preference is to manufacture the compounds in question by producing an intermediate amine by reaction between an ester and a tertiary amine, although it is understood that any of the procedures previously described may be employed. If derived from the fatty acids, the naturally-occurring glycerides are employed. If derived from petroleum acids, such as naphthenic acids, or from rosin acids, such as abietic acid, then any suitable ester, such as an ester derived from glycerol, ethylene glycol, or a monohydric alcohol, such as ethyl alcohol, may be employed.

The manufacture of intermediate compounds from tertiary amines is relative simple, because no precautions are necessary to prevent amidification. The selected non-hydroxy fatty oil, if such be employed, and the selected tertiary amine, are mixed together in suitable proportions and heated at some point above the boiling point of water, for instance, 110° C., and at a point below the decomposition point of the amine or the fatty oil, for instance, 180° C., for a suitable period of time, such as two to eight hours. Mild agitation is employed. A catalyst, such as sodium oleate, sodium carbonate, caustic soda, etc., may be present in amounts of about one-half of one percent or less. It is to be noted that the fatty acids are employed in this instance in the form of an ester, to wit, the glyceride, although, as previously pointed out, other functional equivalents can be readily employed with equal facility, provided that the acyl radical R.CO. is present. It is to be noted that the reactions above described do not take place to any appreciable extent, if the fatty acid has been converted into a soap or salts. Such salts are not functional equivalents. When, however, one is employing a hydroxy primary or a hydroxy secondary amine, precautions must be taken so that one obtains a substantial percentage of products derived by esterification, rather than amidification. Any suitable ester may be employed, but it is most convenient to use the ester of a fatty acid, for instance, olein.

In order to illustrate suitable examples of the amines which may be used as intermediate raw materials, the following examples are given:

Intermediate amine—Example 1

Olein is employed. For convenience, its molecular weight is considered as 875. Amyl diglycerylamine and olein in the proportion of one mol of olein to one mol of amyldiglycerylamine are heated at a temperature between 150 degrees and 180 degrees C. for about 2 hours. Mild agitation is employed. The mono-hydroxy reaction product so produced may be used as such in subsequent reactions, or may be converted into the acetate, or some other suitable form. The product is characterized by freedom from non-acylated hydroxyl hydrocarbon radicals. The composition of this type of material may be exemplified by the following structural formula:

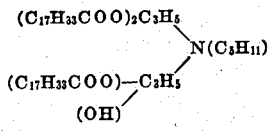

Intermediate amine—Example 2

The procedure of the previous example is followed, except that the ratio is changed so as to employ two mols of olein and three mols of the amine, so as to yield a dihydroxylated compound.

Intermediate amine—Example 3

Ethyl stearate is employed in the proper stoichiometrical ratio, instead of olein, as in Examples 1 and 2 above.

Intermediate amine—Example 4

Ethylene glycol dipalmitate is employed in suitable proportions in Examples 1 and 2, previously described.

Intermediate amine—Example 5

Methyl naphthenate in proper proportions is used to replace olein in Examples 1 and 2.

Intermediate amine—Example 6

Methyl abietate is substituted in proper proportions for olein in Examples 1 and 2 above.

Having prepared the relatively simpler intermediate amine of the kind previously described, the second step in the preparation of the new composition of matter is to produce an esterified amine of the kind obtainable by reaction of the intermediate amine above described, and a polybasic carboxy acid or its functional equivalent, such as the anhydride, with the proviso that such functional equivalent shall not include (a) the acid esters derived by reaction between a polybasic acid, such as phthalic acid or its anhydride, and an alcohol acid (hydroxy acid) such as ricinoleic acid and the like; or (b) the acid ester derived by a reaction between a polybasic carboxy acid, such as phthalic acid and its anhydride, and a fractional ester of the detergent-forming acid, such as mono-olein, mono-naphthenin, mono-abietin, etc.

The polybasic carboxy acids which may be employed, including some having at least three carboxyl radicals, are phthalic, succinic, malic, fumaric, citric, maleic, adipic, tartaric, glutaric, diphenic, naphthalic, oxalic, etc.

Having prepared the intermediate amines above described, it is only necessary to react such amines with the selected polybasic carboxy acid or its functional equivalent in such a manner as to produce an esterified product as differentiated from a salt. There is no objection to salt formation, provided that esterification also takes place.

Composition of matter—Example 1

The amine obtained in the manner described under Intermediate amine—Example 1 is reacted with phthalic anhydride in molecular proportions. This is a conventional esterification reaction, and the materials are intimately mixed and heated to approximately 120 to 180 degrees C., or even higher, with constant agitation, until samples taken out from the batch and analyzed show substantially complete disappearance of the hydroxyl value and substantially no free phthalic anhydride. In the event that the hydroxyl radical disappears and phthalic anhydride is still present, the molecular proportions should be changed so that the amount of phthalic anhydride is decreased slightly. A suitable solvent may be present, and any water formed may be distilled off continuously during the esterification process. The solvent may remain behind in the final product, or may be removed, if desired. If desired, the acidic mass may be neutralized with any suitable amine, such as triethanolamine, cyclohexylamine, triamylamine, etc.

Composition of matter—Example 2

Butyl acid phthalate is substituted for phthalic anhydride in the previous example.

Composition of matter—Example 3

Potassium acid phthalate is substituted for phthalic anhydride in Composition of matter—Example 1 above.

Composition of matter—Example 4

The same procedure is followed as in Composition of matter—Example 1 above, except that no solvent is employed, and when the reaction is complete, one mol or slightly less of glycerol is added and esterification continued until all the glycerol present is chemically combined.

Composition of matter—Example 5

Ethylene glycol is substituted for glycerol in Composition of matter—Example 4 immediately preceding.

Composition of matter—Example 6

Diethylene glycol is substituted for glycerol in Composition of matter—Example 4 immediately preceding.

Composition of matter—Example 7

The monoethyl ether derivative of ethylene glycol is employed in place of glycerol in Composition of matter—Example 4 above.

*Composition of matter—Example 8*

Octyl alcohol is substituted for glycerol in Composition of matter—Example 4 above.

*Composition of matter—Example 9*

Oleyl alcohol is substituted for glycerol in Composition of matter—Example 4 above.

*Composition of matter—Example 10*

Maleic anhydride is substituted for phthalic anhydride in Composition of matter—Examples 1-9, inclusive.

*Composition of matter—Example 11*

Citric acid is substituted for phthalic acid in Composition of matter—Examples 1-9, inclusive.

*Composition of matter—Example 12*

Other intermediate amines of the kind described under the headings "Intermediate amine—Examples 2-6," inclusive, are substituted for intermediate amines in the prior examples.

It is evident that where reference is made to phthalic acid, some simple derivative, such as chlorinated phthalic acid, brominated phthalic acid, methylated phthalic acid, or the like, would simply act as a functional equivalent. This applies not only to phthalic acid, but all the polybasic acids enumerated or suggested. Similarly, it is evident that there is no intention to differentiate between isomeric forms. One isomeric form may serve as well as another.

We desire to emphasize that the products obtained in the above examples, when employed as demulsifiers to resolve a petroleum emulsion, may be used in the form of the amine by direct contact with the emulsion without contact with water. It may be contacted with water, i. e., in the form of a solution so as to produce, in a greater or lesser degree, the amine base. Furthermore, any of the products above described may be combined with a suitable acid. Acetic acid may be employed. Hydrochloric acid is particularly desirable. In some instances acids, such as oleic acid or naphthenic acid, may be employed to give a suitable salt. As previously pointed out, any carboxylic hydrogen atom may be replaced by a suitable metallic atom, or an organic radical derived from an alcohol, or from an amine. All such ionizable hydrogen atom equivalents are considered as the functional equivalent of the ionizable hydrogen atoms themselves, and such neutralized forms are included in the scope of the appended claims as the equivalent of the acidic form. The expression "detergent-forming acid compound" is employed to include the acid itself, as well as suitable compounds thereof. It is realized that where a free carboxyl and a basic amine residue exists in the same molecule, there may be a tendency towards the formation of inner salts comparable to sulfanilic acid; but due to the size of the molecule involved, and perhaps for reasons of steric hindrance, we are not aware that such inner salts are formed.

Briefly, then, the preparation of the composition of matter herein contemplated depends on a reaction involving a polybasic carboxy acid body, or its functional equivalent, as described, and the complex amine of the kind described, in such a manner as to involve reactions other than salt formation. In other words, the complex amines are basic in nature, and therefore, could react with a polybasic acid to form a salt in a manner, which, for the sake of convenience, will be indicated by a somewhat simpler reaction, thus:

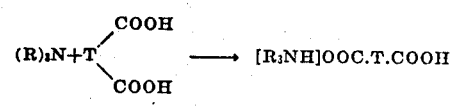

or

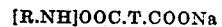

Such reactions are purely salt formation. The materials of the kind herein contemplated, regardless of their nature, are of the kind obtained by reactions other than salt formation, and also other than amidification.

We desire to emphasize that the expression "polybasic carboxy acid," employed in the claims, refers not only to the acid itself, but to any functional equivalent, such as the anhydride, the acyl chloride, a salt form having at least two free carboxyls, such as mono-sodium citrate, etc. It is also understood that in the hereto appended claims the nature of the final product is not limited to the form having a free carboxylic hydrogen atom, but that such free carboxylic hydrogen atom may be actually replaced by any functional equivalent of the kind previously described, for instance, a metallic atom, an ammonium radical, an amine radical, such as an amylamine radical, benzylamine radical, ethanolamine radical, diethanolamine radical, triethanolamine radical, a hydrocarbon radical, such as an ethyl, methyl, propyl, or amyl radical, a radical derived from ethylene glycol, glycerol, or the like; a cyclohexyl radical, benzyl radical, etc. All such forms in which such hydrogen atom equivalent replaces an ionizable hydrogen atom, are obvious functional equivalents.

Attention is directed to the fact that the word "amidification" has been applied to the reaction involving the replacement of an amine hydrogen atom by an acyl radical, without conventional limitation to a reaction involving ammonia. The replacement of the amino hydrogen atom of a primary amine or a secondary amine by an acyl radical has been considered as being amidification, rather than the formation of a substituted amide, or the formation of an imide or substituted imide. Such obvious departure from conventional nomenclature has been for purposes of simplicity and to show the similarity between certain reactions.

In the hereto appended claims, reference to the product derived by reaction between a polybasic carboxy acid body of the kind previously described and an amine of the kind previously described is meant to refer to such products in all their various modifications previously referred to, to wit, such substances where carboxylic hydrogen atoms appear as such, or have been replaced by metallic atoms, alkyl radicals derived from various alcohols, amine radicals or residues, etc.; and as to the presence of any basic amine-nitrogen atom, it may be in the amine form, or in salt form, or in a base form, as, for example, is obtainable by contact with water.

The functional equivalents of all these variations have been pointed out previously and are readily comprehended; and the scope of the claims in the light of such obvious equivalents requires no further discussion.

As to blown oils, blown fatty acids, polymerized oils, polymerized fatty acids, and other similar materials obtainable by oxidation, it is understood that it is not intended that they should be reacted with amines to produce the intermediate amine, which, in turn, is reacted with a polybasic carboxy acid to produce the new composition of matter.

For convenience, in the hereto appended claims the expression "hydrocarbon radical derived from a glycerylamine" is intended to include the various homologs and analogs of glycerylamine, and thus, is used in the generic sense to include the glycerylamines derived from diglycerol, triglycerol, etc., as well as the more common glycerylamines derived from glycerol. Where the hydrocarbon radical from conventional glycerylamine is intended, reference will be made to the $C_3H_5$ radical.

Attention is directed to the fact that in at least part of the hereto appended claims reference is made to an acyl radical R.CO derived from a detergent-forming acid, and similarly, reference is made to the acid radical R'COO derived from an acid such as acetic acid, butyric acid, and the like, and it is to be noted where such radicals occur more than once in the finished product or completed molecule, that such repeated occurrences need not be identical, for instance, in such cases where R.CO appears more than once, it may in one instance, be derived from oleic acid, in the second instance, from palmitic acid, etc., and where R'COO occurs more than once, it may be derived in one instance from acetic acid, in the second instance from butyric acid, etc.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the herein described material as a demulsifier for petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In using our new material or composition of matter to break a petroleum emulsion, said material is brought into contact with or caused to act upon the emulsion to be treated, in any of the various ways or by any of the various apparatus now generally used to resolve or break petroleum emulsions with a chemical reagent, the above procedure being used either alone, or in combination with other demulsifying procedure, such as the electrical dehydration process.

Having thus described our invention, what we claim as new and desire to secure by Letters Patent is:

1. A product derived by an esterification reaction between: first, a polybasic carboxy acid compound characterized by: (a) the presence of at least one free carboxyl radical; (b) the absence of any hydroxy fatty acid radical as a substituent for an acidic hydrogen atom of any carboxyl radical; and (c) the absence of any polyhydric alcohol radical as the substituent for an acidic hydrogen atom of any carboxyl radical if said polyhydric alcohol radical is also united with one or more monobasic carboxy detergent-forming acid radicals; and second, an acylated hydroxy amine derived by esterification reaction between: (A) a detergent-forming acid compound containing the acyl radical R.CO, in which R is a hydrocarbon radical containing at least 8 carbon atoms and not more than 32 carbon atoms; and (B) an amine of the formula type:

in which R' is a hydrocarbon radical containing less than 8 carbon atoms, D is a hydrocarbon radical derived from a glycerylamine, T is a monovalent radical selected from the class consisting of alkyl radicals, alicyclic radicals, aralkyl radicals, non-hydroxylated acylated alkanol radicals and hydrogen atoms, and $n$ represents the numeral 0 to 3, $m$ represents the numeral 1 to 4, $m'$ represents the numeral 0 to 3, and $n'$ represents the numeral 1 to 3, with the proviso that $n'+m'=3$, and said acylated hydroxy amine being additionally characterized by absence of any unacylated hydroxy substituted hydrocarbon radicals.

2. A product derived by an esterification reaction between: first, a polybasic carboxy acid compound characterized by: (a) the presence of at least one free carboxyl radical; (b) the absence of any hydroxy fatty acid radical as a substituent for an acidic hydrogen atom of any carboxyl radical; and (c) the absence of any polyhydric alcohol radical as the substituent for an acidic hydrogen atom of any carboxyl radical if said polyhydric alcohol radical is also united with one or more monobasic carboxy detergent-forming acid radicals; and second, an acylated hydroxy amine derived by esterification reaction between: (A) a detergent-forming acid compound containing the acyl radical R.CO, in which R is a hydrocarbon radical containing at least 8 carbon atoms and not more than 32 carbon atoms; and (B) an amine of the formula type:

in which R' is a hydrocarbon radical containing less than 8 carbon atoms, D is a hydrocarbon radical derived from a glycerylamine, T is a monovalent radical selected from the class consisting of alkyl radicals, alicyclic radicals, aralkyl radicals, and non-hydroxylated acylated alkanol radicals, and $n$ represents the numeral 0 to 3, $m$ represents the numeral 1 to 4, $m'$ represents the numeral 0 to 2, and $n'$ represents the numeral 1 to 3, with the proviso that $n'+m'=3$, and said acylated hydroxy amine being additionally characterized by absence of any unacylated hydroxy substituted hydrocarbon radicals.

3. A product derived by an esterification reaction between: first, a polybasic carboxy acid compound characterized by: (a) the presence of at least one free carboxyl radical; (b) the absence of any hydroxy fatty acid radical as a substituent for an acidic hydrogen atom of any carboxyl radical; and (c) the absence of any polyhydric alcohol radical as the substituent for an acidic hydrogen atom of any carboxyl radical if said polyhydric alcohol radical is also united with one or more monobasic carboxy detergent-forming acid radicals; and second, an acylated hydroxy amine derived by esterification reaction between: (A) a detergent-forming acid compound containing the acyl radical R.CO, in which R is a hydrocarbon radical containing at least 8 carbon atoms and not more than 32 carbon atoms; and (B) an amine of the formula type:

$$[D(OH)_m]_{n'}NT_{m'}$$

in which D is a hydrocarbon radical derived from a glycerylamine, T is a monovalent radical selected from the class consisting of alkyl radicals, alicyclic radicals, aralkyl radicals, and non-hydroxylated acylated alkanol radicals, and $m$ represents the numeral 1 to 4, $m'$ represents the numeral 0 to 2, and $n'$ represents the numeral 1 to 3, with the proviso that $n'+m'=3$, and said acylated hydroxy amine being additionally characterized by absence of any unacylated hydroxy substituted hydrocarbon radical.

4. A product derived by an esterification reaction between: first, a polybasic carboxy acid compound characterized by: (a) the presence of at least one free carboxyl radical; (b) the absence of any hydroxy fatty acid radical as a substituent for an acidic hydrogen atom of any carboxyl radical; and (c) the absence of any polyhydric alcohol radical if said polyhydric alcohol radical is also united with one or more monobasic carboxy detergent-forming acid radicals; and second, an acylated hydroxy amine derived by esterification reaction between: (A) a fatty acid compound containing the acyl radical R.CO, in which R is a hydrocarbon radical containing at least 8 carbon atoms and not more than 32 carbon atoms; and (B) an amine of the formula type $$[D(OH)_m]_{n'}NT_{m'}$$

in which D is a hydrocarbon radical derived from a glycerylamine, T is a monovalent radical selected from the class consisting of alkyl radicals, alicyclic radicals, aralkyl radicals, and non-hydroxylated acylated alkanol radicals, and $m$ represents the numeral 1 to 4, $m'$ represents the numeral 0 to 2, and $n'$ represents the numeral 1 to 3, with the proviso that $n'+m'=3$, and said acylated hydroxy amine being additionally characterized by absence of any unacylated hydroxy substituted hydrocarbon radical.

5. A product derived by an esterification reaction between: first, a dibasic carboxy acid compound characterized by: (a) the presence of at least one free carboxyl radical; (b) the absence of any hydroxy fatty acid radical as a substituent for an acidic hydrogen atom of any carboxyl radical; and (c) the absence of any polyhydric alcohol radical if said polyhydric alcohol radical is also united with one or more monobasic carboxy detergent-forming acid radicals; and second, an acylated hydroxy amine derived by esterification reaction between: (A) a fatty acid compound containing the acyl radical R.CO, in which R is a hydrocarbon radical containing at least 8 carbon atoms and not more than 32 carbon atoms; and (B) an amine of the formula type $$[D(OH)_m]_{n'}NT_{m'}$$

in which D is a hydrocarbon radical derived from a glycerylamine, T is a monovalent radical selected from the class consisting of alkyl radicals, alicyclic radicals, aralkyl radicals, and non-hydroxylated acylated alkanol radicals, and $m$ represents the numeral 1 to 4, $m'$ represents the numeral 0 to 2, and $n'$ represents the numeral 1 to 3, with the proviso that $n'+m'=3$, and said acylated hydroxy amine being additionally characterized by absence of any unacylated hydroxy substituted hydrocarbon radical.

6. A product derived by an esterification reaction between: first, phthalic anhydride; and second, an acylated hydroxy amine derived by esterification reaction between: (A) a fatty acid compound containing the acyl radical R.CO, in which R is a hydrocarbon radical containing at least 8 carbon atoms and not more than 32 carbon atoms; and (B) an amine of the formula type:

$$[D(OH)_m]_{n'}NT_{m'}$$

in which D is a hydrocarbon radical derived from a glycerylamine, T is a monovalent radical selected from the class consisting of alkyl radicals, alicyclic radicals, aralkyl radicals, and non-hydroxylated acylated alkanol radicals, and $m$ represents the numeral 1 to 4, $m'$ represents the numeral 0 to 2, and $n'$ represents the numeral 1 to 3, with the proviso that $n'+m'=3$, and said acylated hydroxy amine being additionally characterized by the absence of any unacylated hydroxy substituted hydrocarbon radical.

7. A product derived by an esterification reaction between: first, phthalic anhydride; and second, an acylated hydroxy amine derived by esterification reaction between: (A) a fatty acid compound containing the acyl radical R.CO, in which R is a hydrocarbon radical containing at least 8 carbon atoms and not more than 32 carbon atoms; and (B) an amine of the formula type:

$$[(OH)_2C_3H_5]_{n'}NT_{m'}$$

in which T is a monovalent radical selected from the class consisting of alkyl radicals, alicyclic radicals, aralkyl radicals, and non-hydroxylated acylated alkanol radicals, and $m'$ represents the numeral 0 to 2, and $n'$ represents the numeral 1 to 3, with the proviso that $n'+m'=3$, and said acylated hydroxy amine being additionally characterized by absence of any dihydroxypropyl radical.

8. A product derived by esterification reaction between: first, phthalic anhydride; and second, an acylated hydroxy amine derived by esterification reaction between: (A) an oleic acid compound containing the oleyl radical; and (B) an amine of the formula type:

$$[(OH)_2C_3H_5]_{n'}NT_{m'}$$

in which T is a monovalent radical selected from the class consisting of alkyl radicals, alicyclic radicals, aralkyl radicals, and acylated alkanol radicals, and $m'$ represents the numeral 0 to 2, and $n'$ represents the numeral 1 to 3, with the proviso that $n'+m'=3$, and said acylated hydroxy amine being additionally characterized by absence of any dihydroxypropyl radical.

9. A product derived by an esterification reaction between: first, phthalic anhydride; and second, an acylated hydroxy amine derived by esterification reaction between: (A) an oleic acid compound containing the oleyl radical; and (B) an amine of the formula type:

$$[(OH)_2C_3H_5]_{n'}NT_{m'}$$

in which T is a monovalent alkyl radical, and $m'$ represents the numeral 0 to 2, and $n'$ represents the numeral 1 to 3, with the proviso that $n'+m'=3$, and said acylated hydroxy amine being additionally characterized by absence of a dihydroxypropyl radical.

MELVIN DE GROOTE.
BERNHARD KEISER.
CHARLES M. BLAIR, Jr.